Patented Dec. 13, 1927.

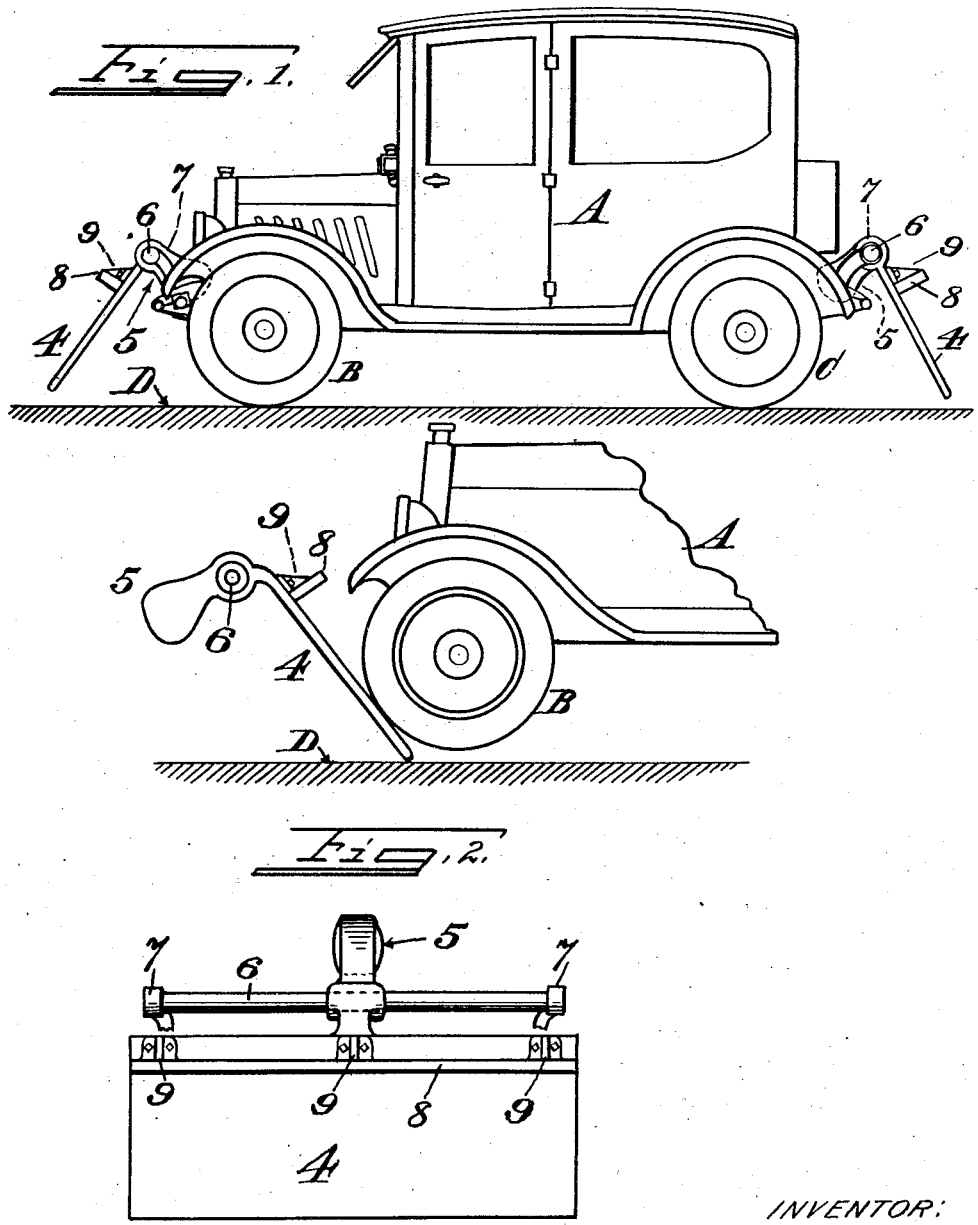

1,652,170

UNITED STATES PATENT OFFICE.

WILLIAM S. GREGORY, OF CINCINNATI, OHIO.

SAFETY BUFFER APPARATUS FOR AUTOMOBILES AND OTHER VEHICLES.

Application filed January 8, 1925. Serial No. 1,316.

This invention relates to safety buffer devices for use on automobiles and other road or pavement vehicles that are adapted to harmlessly receive the shock and force of collision or contact in connection with the machine that is struck as well as the one doing the striking, and thereby relieve both machines of material injury occasioned by such striking, whether at high or at low speed or with vehicles of varying sizes and weights.

The invention herein is extremely simple, easily constructed and applied, and economical as to original installation and subsequent actual use, and, furthermore, not easily gotten out of order or commission in said use.

In the accompanying sheet of drawings—

Figure 1 is a side elevation of an automobile, showing my improved buffer-attachments at its opposite ends; Fig. 2, a fragmentary side elevation of the fore end of an automobile and an end view of one of my buffer-attachments, in action; and Fig. 3, a plan view of my improved buffer-attachment herein, showing its mounting arms broken off just below the opposite ends of their pivotal-shaft.

A indicates an ordinary automobile of the pleasure-car type, having fore-wheels B and hind-wheels C, as customary.

My buffer-attachment herein is preferably applied to the rear end of the vehicle, but it may be advantageously applied to both the front and rear ends, as shown in Fig. 1. In Fig. 2 the device is shown at the rear end of a vehicle in front of one that has struck said device with the fore-wheels of the rear striking-vehicle in risen but concluded contact with the said buffer device.

The buffer-attachment is composed of a main plate or shield 4, of rectangular outline, as best seen in Fig. 3. This shield represents the body-portion and is preferably made of armor-plate that is adapted to withstand the shock of an advancing blow of a rear or other oncoming vehicle whose fore-wheels B strike the lower part of the outer face of said shield and rise a short distance, as seen in Fig. 2, when the shock of collision or vibration is diverted to the ground or pavement surface D and there dispelled or absorbed without any transmission into either vehicle, neither the fore nor the rear one.

The lower edge of the shield 4 is normally held away from the ground by means of a slightly overbalancing weight 5 that extends centrally from its upper edge, and the shield is mounted upon a transverse shaft 6 journalling in bracket-arms 7, 7, and tilted rearwardly, in position for automatically swinging forwardly, at the instant the fore-wheels of the rear vehicle strike it and thereby cause the said lower edge to impinge or contact with the pavement surface in a forcible manner, the further advance of said rear vehicle being then checked or stopped except to coincide with the speed at which the fore vehicle is going, or otherwise stopping altogether if said fore vehicle was previously at rest.

As an extra precaution I provide an auxiliary obstruction near the upper edge of the main shield or body-portion 4, such obstruction being composed of a flange or shallow plate or bar 8 that extends transversely across and outwardly from the said main shield at a right-angle and has a series of back-stops or braces 9. It is obvious that in the operation of an automobile there are times when extra precautions may be taken for emergencies and this one that embodies the said auxiliary braced obstruction near the upper edge, or possibly midway between the upper and lower edges of the main-shield 4, is adapted to be sure to catch the oncoming wheels of the striking vehicle and just as surely prevent their further advance, as well as to still further assure the impingement or clinging-contact of the lower edge of the said main shield into instant stopping or braking force with the shock and vibration absorbing surface of the roadway below.

While my device is not shown as in place on the opposite sides of the vehicle it is my purpose, and it is to be understood hereby, that the shock receiving and dispelling plate can be utilized and mounted in a suitable manner on said sides so as not to interfere with ingress and egress, and to receive side blows from approaching vehicles at the sides, and to dispel them into the shock and damage absorbing surface below.

I claim:—

1. In an automobile or other similar roadway vehicle, the combination of a pair of tilted safety buffer-plates each of which is pivotally-hung at its upper edge from one of the opposite ends of the said vehicle and having its lower edge normally elevated to clear ordinary obstructions, and a balance-weight extending from the upper edge of the buffer-plate and adapting it to be automatically swung downwardly so that its said lower edge shall come into positive scraper-contact with the surface of said roadway when in collision with an approaching vehicle, in either direction.

2. In an automobile or other similar roadway vehicle, the combination of a pair of tilted safety buffer-plates each of which is pivotally-hung at its upper edge from one of the opposite ends of the said vehicle and having its lower edge normally elevated to clear ordinary obstructions, a balance-weight extending from the said upper edge of the buffer-plate and adapting it to be automatically swung downwardly so that its said lower edge shall make positive scraper-contact with the surface of the roadway when in collision with an approaching vehicle, in either direction, and a longitudinal auxiliary braced flange or raised impediment extending outwardly across the buffer-plate below its said upper edge and adapted to still further prevent the colliding vehicle riding or continuing on up the outer surface of the tilted safety buffer-plate.

WILLIAM S. GREGORY.